(12) United States Patent
Hultmark et al.

(10) Patent No.: US 12,716,910 B2
(45) Date of Patent: Aug. 25, 2026

(54) MULTI-WIRE VELOCITY SENSOR

(71) Applicant: Tendo Technologies Inc., Princeton, NJ (US)

(72) Inventors: Marcus Hultmark, Princeton, NJ (US); Yuyang Fan, Princeton, NJ (US)

(73) Assignee: Tendo Technologies, Inc., Princeton, NJ (US)

( * ) Notice: Subject to any disclaimer, the term of this patent is extended or adjusted under 35 U.S.C. 154(b) by 288 days.

(21) Appl. No.: 18/541,710

(22) PCT Filed: Jun. 16, 2022

(86) PCT No.: PCT/US2022/033743
§ 371 (c)(1),
(2) Date: Dec. 15, 2023

(87) PCT Pub. No.: WO2022/266295
PCT Pub. Date: Dec. 22, 2022

(65) Prior Publication Data

US 2025/0123302 A1 Apr. 17, 2025

Related U.S. Application Data

(60) Provisional application No. 63/211,846, filed on Jun. 17, 2021.

(51) Int. Cl.
*G01P 5/12* (2006.01)
*G01F 1/69* (2006.01)
(Continued)

(52) U.S. Cl.
CPC .................. *G01P 5/12* (2013.01); *G01F 1/69* (2013.01); *G01F 1/698* (2013.01); *H05B 1/0244* (2013.01);
(Continued)

(58) Field of Classification Search
CPC ........................................................ G01P 5/12
See application file for complete search history.

(56) References Cited

U.S. PATENT DOCUMENTS 3,742,761 A * 7/1973 Randall .................... G01F 1/68 73/204.24
4,275,602 A 6/1981 Fujishiro et al.
(Continued)

FOREIGN PATENT DOCUMENTS

DE 2729743 A1 1/1979
EP 0405452 B1 * 9/1993 ............ G01C 19/58
(Continued)

OTHER PUBLICATIONS

International Search Report & Written Opinion for corresponding PCT Application No. PCT/US2022/033743, dated Oct. 12, 2022.
(Continued)

*Primary Examiner* — John E Breene
*Assistant Examiner* — Alex T Devito
(74) *Attorney, Agent, or Firm* — Meagher, Emanuel, Laks, Golberg & Liao, LLP

(57) ABSTRACT

A hot wire anemometer including a substrate defining an opening through the substrate, configured to allow a fluid to flow through the opening, and multiple substantially parallel conductive wires, connected in series across the opening, in a direction parallel to a first surface of the substrate, where each wire is separated from adjacent wires by a distance that is 0.1 to 25 times the dimension of the wire in the transverse direction.

33 Claims, 7 Drawing Sheets

(51) Int. Cl.

| | |
|---|---|
| ***G01F 1/698*** | (2006.01) |
| ***H05B 1/02*** | (2006.01) |
| ***H05B 3/06*** | (2006.01) |
| ***H05B 3/12*** | (2006.01) |
| ***H05B 3/14*** | (2006.01) |
| ***H05B 3/40*** | (2006.01) |

(52) U.S. Cl.

CPC ................. *H05B 3/06* (2013.01); *H05B 3/12* (2013.01); *H05B 3/146* (2013.01); *H05B 3/40* (2013.01); *H05B 2203/007* (2013.01); *H05B 2203/035* (2013.01)

(56) References Cited

U.S. PATENT DOCUMENTS

| | | | | |
|---|---|---|---|---|
| 4,561,303 | A * | 12/1985 | McCarthy ............. | G01F 1/6845 216/2 |
| 2006/0235314 | A1* | 10/2006 | Migliuolo ............ | A61B 1/0011 600/549 |
| 2007/0202007 | A1 | 8/2007 | Augstein et al. | |
| 2012/0234694 | A1* | 9/2012 | Vecitis ................... | B01D 35/06 204/264 |
| 2017/0293308 | A1* | 10/2017 | Ishii .......................... | G01F 1/68 |
| 2018/0252559 | A1 | 9/2018 | Hultmark et al. | |
| 2019/0301908 | A1 | 10/2019 | Kisban et al. | |
| 2020/0233006 | A1* | 7/2020 | Fan ........................... | G01P 5/12 |

FOREIGN PATENT DOCUMENTS

| | | | |
|---|---|---|---|
| EP | 1291621 | A1 | 3/2003 |
| JP | S5599026 | A | 7/1980 |
| WO | 2023093471 | A1 | 6/2023 |

OTHER PUBLICATIONS

European Search Report for corresponding EP Application No. 22825797, dated Mar. 17, 2025.

* cited by examiner

MULTI-WIRE VELOCITY SENSOR

CROSS-REFERENCE TO RELATED APPLICATIONS

The present disclosure claims priority to U.S. Provisional Patent Application 63/211,846, filed Jun. 17, 2021, which is incorporate by reference herein in its entirety.

BACKGROUND

A hot-wire anemometer is a device widely used today to measure the flow rate, mainly using a hot wire probe having a single wire as a sensing element. The wire is usually made of a metal material such as tungsten, platinum, or platinum-rhodium alloy, and is heated to an elevated temperature by an electric current and is therefore called a "hot wire". As the fluid flows across the hot wire, the heat transfer rate from the hot wire to the fluid increases. This increase can be monitored and correlated to the fluid velocity. In systems without feedback, it results in decreased temperature of the hot wire, and in systems with feedback that aims to keep the temperature constant, it results in increased current through the wire. Most electrically conductive materials have a resistance that changes with temperature, so a correlation can be readily obtained between the resistance of the hot wire and the flow velocity of the fluid. By this mutual relationship, the flow rate of the fluid flowing through the hot wire can be derived from the resistance of the hot wire in conjunction with an appropriate circuit, and this method of measuring the flow rate is called hot-wire anemometry.

However, hot wire anemometers must choose between cost and sensitivity—the larger the diameter, the more sensitive the wire is, but the more expensive it is as well. A larger wire also implies a slower response as the thermal mass is increased.

SUMMARY

A first aspect of the present disclosure is drawn to a velocity sensor. The velocity sensor comprises at least two components: (i) a substrate that defines an opening through the substrate to allow a fluid (such as air or water) to flow through the opening, and (ii) a plurality of substantially parallel electrically conductive wires, connected in series, across the opening, parallel to an outer surface of the substrate, where each wire is separated from an adjacent wire by a distance between 0.1 and 25 times (and preferably between 0.1 and 10 times, and more preferably between 0.1 and 5 times) the dimension in the transverse direction of the wire.

The wires will typically have a large length-to-width aspect ratio, such as between 10 and 500 (e.g., length is 10-500 times the width). Optionally, each wire has a dimension in the transverse direction that is less than $50\mu/U\rho$ throughout a predetermined operating range, where $\mu$ is viscosity of the fluid stream, $\rho$ is density of the fluid stream, and U is velocity of the fluid stream relative to the at least one wire filament. Optionally, the dimension in the transverse direction of each conductive wire is between 1 μm and 20 μm, and the separation between each conductive wire is between 5 μm and 60 μm.

While any number of wires may be used, preferably the sensor uses between 5 and 50 wires, such as between 10 and 25 wires.

The wires preferably do not deflect by any significant amount. In some embodiments, each conductive wire is configured to have a maximum deflection throughout the predetermined operating range of less than 0.01% of the length of the wire. Alternatively, the electrical effect due to heating is significantly larger than any electrical effect due to deflection.

While each wire may have any appropriate cross-section, in a preferred embodiment, each conductive wire has a rectangular cross-section.

While each wire may be comprised of any conductive material, in some embodiments, at least one wire (and preferably all wires) comprises a pure metal or a metal alloy, an electrically conductive polymer, a semiconductor material or a piezoresistive material, or a combination thereof. In some embodiments, at least one wire (and preferably all wires) comprises two or more materials, such as a nickel-chrome alloy.

Other sensing wires, not connected in series, may also be included to aid the sensor in consistently measuring velocity even in changing fluid conditions. For example, in one embodiment, at least one additional wire not in series with the plurality of substantially parallel conductive wires, the at least one additional wire having a different sensitivity to temperature.

A second aspect of the present invention is drawn to a velocity sensor system, comprising (a) the previously described velocity sensor, (b) a measuring circuit (which may include, e.g., a Wheatstone bridge) configured to measure at least one of a voltage or a current of the velocity sensor system, and (c) a power circuit configured to ensure each wire operates with an overheat ratio a of between 1.01 and 5.

Preferably, the system is configured such that each wire has a temperature between 60° C. and 500° C.

The system may include other components, such as a sensor housing adapted to protect at least the circuits, or a processor adapted to receive information from the measuring circuit comprising a voltage or current and determine a fluid stream velocity based on the received information. The system may also optionally include a wired or wireless transceiver capable of transmitting a signal comprising the voltage from the measuring circuit, the resistance of the wires, a calculated fluid stream velocity, or a combination thereof.

A third aspect of the present disclosure is drawn to a method for determining velocity of a fluid stream. The method involves providing a velocity sensor as described previously, causing each wire to have a temperature between 60° C. and 500° C., and allowing a fluid to pass through the opening. Then, depending on the exact configuration of the measuring circuit, either (i) measuring a change in the resistance of each of the plurality of substantially parallel conductive wires while the fluid is passing through the opening and equating the velocity of the fluid to the result of a function of the at measured resistances; or (ii) adjusting the voltage to keep the resistance of each of the plurality of substantially parallel conductive wires constant while the fluid is passing through the opening and equating the velocity of the fluid to the adjusted voltage.

DETAILED DESCRIPTION

Figure 1:
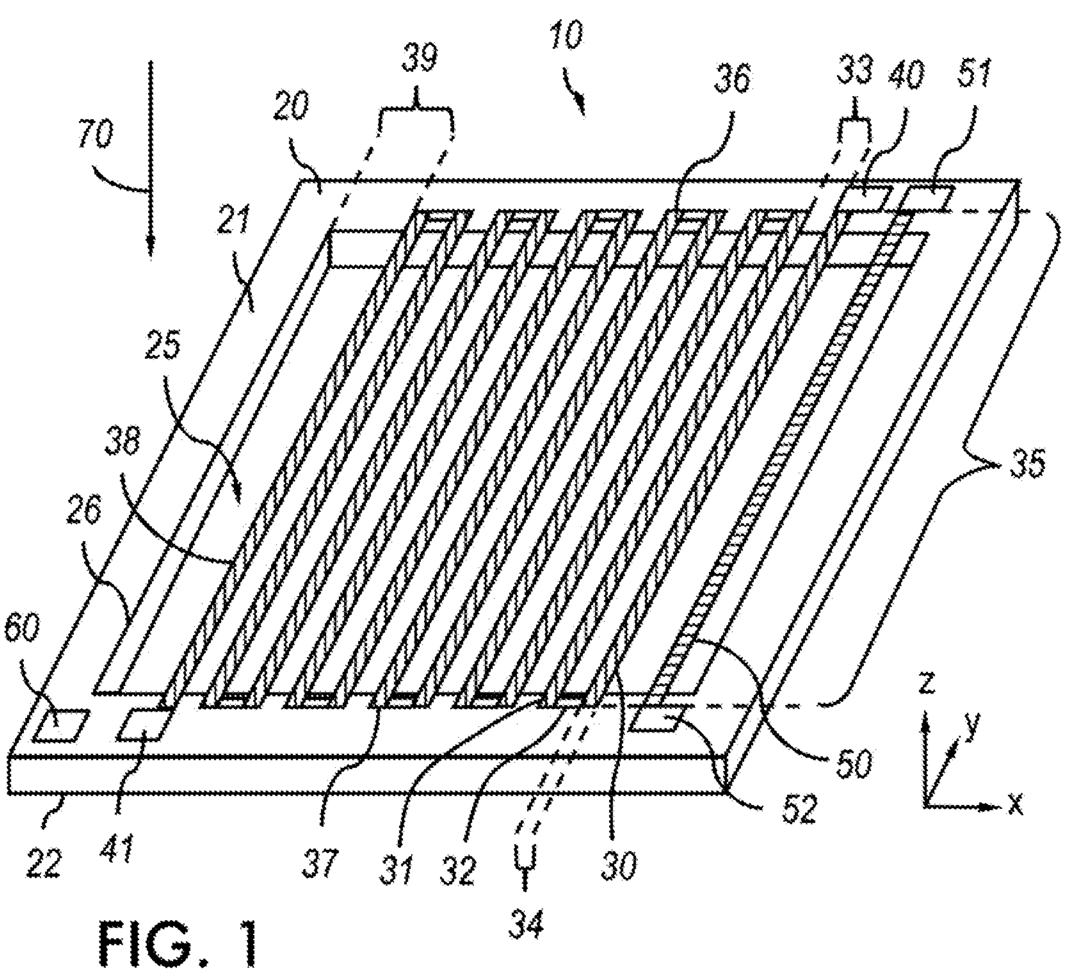
FIG. 1 is an illustration of a velocity sensor.

Embodiments of the present disclosure are described in detail with reference to the figures wherein like reference numerals identify similar or identical elements. It is to be understood that the disclosed embodiments are merely examples of the disclosure, which may be embodied in various forms. Well known functions or constructions are not described in detail to avoid obscuring the present disclosure in unnecessary detail. Therefore, specific structural and functional details disclosed herein are not to be interpreted as limiting, but merely as a basis for the claims and as a representative basis for teaching one skilled in the art to variously employ the present disclosure in virtually any appropriately detailed structure.

A first aspect of the present disclosure is a velocity sensor for measuring the velocity of a fluid (such as a gas or liquid). The sensor can be described with respect to FIG. 1.

In FIG. 1, the velocity sensor 10 may include two components: a substrate 20 and a plurality of conductive wires 30, 31.

The substrate 20 may be a non-conducting, stiff material (such as silicon, silica, fiberglass, epoxy, etc.) or a flexible material (such as a polydimethylsiloxane (PDMS) or a polyimide), that has a first surface 21 that is typically configured to be placed normal to the direction of fluid flow 70.

In some embodiments, the substrate comprises silicon. In some embodiments, the substrate comprises silica. In some embodiments, the substrate comprises fiberglass. In some embodiments, the substrate comprises epoxy. In some embodiments, the substrate comprises a polydimethylsiloxane (PDMS). In some embodiments, substrate the comprises a polyimide.

The substrate 20 may define an opening 25 extending through the substrate from the first surface 21 to a second surface 22 opposite the first surface. The opening may be configured to allow a fluid to be measured to pass through the opening.

The plurality of conductive wires 30, 31 may be arranged to be parallel to each, and positioned other across the opening 25. The wires may be parallel to the first surface 21 of the substrate.

The composition of each conductive wire may be any electrically conductive material. In some embodiments, at least one of the plurality of wires may include a pure metal or a metal alloy, an electrically conductive polymer, a semiconductor material or a piezoresistive material, or a combination thereof. In some embodiments, at least one of the plurality of wires may include two or more materials. In some embodiments, each wire may be comprised of or consists of platinum, titanium, or a nickel-chrome alloy. In some embodiments, each wire, independently, may be coated or treated to prevent the electrically conductive material from interacting with the fluid. In some embodiments, each wire, independently, may be coated with a non-conductive material. In some embodiments, the non-conductive material is a parylene.

In FIG. 1, the direction of fluid flow 70 is shown as being parallel to the z-axis, and the first surface 21 is parallel to the x-y plane. The flow direction 70 can be both in the positive or negative z-direction. Said differently, in some embodiments, the direction of fluid flow may be substantially in the negative-z direction towards the first surface 21, over the wires, and then through the opening (as shown in FIG. 1). In some embodiments, the direction of fluid flow is the reverse of that, e.g., substantially in the positive-z direction (that is, first through the opening, then over the wires, and then away from first surface 21).

The present disclosure describes the dimensions and relationships of the wires used in a velocity sensor in various ways. As used herein, "transverse" and "width" or "diameter" may be used interchangeably as appropriate. If the "length" of the wire is the y-direction, stretching across the opening, the transverse direction is the x-direction. As used herein, "streamwise" and "thickness" may be used interchangeably, referring to the direction the fluid stream will flow across the wires. Again, if the "length" is in the y-direction, the streamwise direction is the z-direction.

The wires may each be substantially the same length 35 (here, length is shown as being parallel to the y-direction). The wires may each be substantially the same width or diameter (e.g., transverse direction 34).

The plurality of wires may include at least 5 wires. In some embodiments, the plurality of wires may include between 5 and 50 wires. In some embodiments, the plurality of wires may include between 10 and 25 wires.

In some embodiments, the wires are arranged in a substantially parallel manner, and each wire 30 may be separated from any adjacent wire 31 by a substantially constant distance 33.

In some embodiments, the distance 33 separating each wire (including any coatings) from an adjacent wire (including any coatings) may be 0.1-10 times the average wire dimension (including any coatings) in the transverse direction 34 (e.g., the width or diameter) of the adjacent wires 30, 31. In some embodiments, the distance 33 separating each wire from an adjacent wire may be 0.1-25 times the maximum dimension in the transverse direction 34 (e.g., the width or diameter) of the adjacent wires 30, 31.

In some embodiments, the distance 33 may be 0.1-5 times the average dimension in the transverse direction 34 of the adjacent wires 30, 31. In some embodiments, the distance 33 may be 0.1-5 times the maximum dimension in the transverse direction 34 of the adjacent wires 30, 31. In some embodiments, the distance 33 may be 0.1-10 times the average dimension in the transverse direction 34 of the adjacent wires 30, 31. In some embodiments, the distance 33 may be 2-60 μm.

In some embodiments, the dimension in the transverse direction 34 of each conductive wire may be 0.5 μm-40 μm, and the separation 33 between each conductive wire may be 5 μm-60 μm. In some embodiments, the transverse direction of each wire may be ≥0.5 μm, ≥1 μm, ≥2 μm, ≥4 μm, ≥6 μm, ≥8 μm, ≥10 μm, ≥12 μm, ≥14 μm, ≥16 μm, or ≥18 μm, and ≤40 μm, ≤30 μm≤20 μm, ≤18 μm, ≤16 μm, ≤14 μm, ≤12 μm, ≤10 μm, ≤8 μm, ≤6 μm, or ≤4 μm, including all combinations or subranges thereof. In some embodiments, the dimension in the transverse direction 34 of each conductive wire may be 1 μm-30 μm. In some embodiments, the dimension in the transverse direction 34 of each conductive wire may be 2 μm-20 μm.

In some embodiments, each conductive wire may have a dimension in the transverse direction 34 that is less than $50\mu/U\rho$ throughout a predetermined operating range of velocities of target fluids, where μ is viscosity of the fluid stream, ρ is density of the fluid stream, and U is velocity of the fluid stream relative to the conductive wire.

In some embodiments, the target fluid is a gas. In some embodiments, the target is air. In some embodiments, the target fluid is oxygen. In some embodiments, the target fluid is carbon dioxide. In some embodiments, the target fluid is nitrogen.

In some embodiments, the target fluid is a Newtonian (or substantially Newtonian) fluid. In some embodiments, the target fluid is a non-Newtonian fluid.

In some embodiments, the target fluid is water. In some embodiments, the target fluid is an aqueous composition. In some embodiments, the aqueous composition may comprise water in an amount of 80%-99.9% by weight of the aqueous composition. In some embodiments, the target fluid is ethanol. In some embodiments, the target fluid is gasoline. In some embodiments, the target fluid is mineral oil. In some embodiments, the target fluid is a syrup. In some embodiments, the syrup is corn syrup. In some embodiments, the syrup is maple syrup. In some embodiments, the target fluid is a cooking oil. In some embodiments, the target fluid is a composition of one or more hydrocarbon oils. In some embodiments, the target fluid is a heat transfer fluid. In some embodiments, the heat transfer fluid is a molten salt. In some embodiments, the target fluid is a solution.

In some embodiments, the operating range of temperatures of the target fluid may be from −150° C. to 1200° C. In some embodiments, the operating range of temperatures, such as in the case of measuring velocities of gases, may be from −100° C. to +300° C. In some embodiments, such as in the case of molten salts, the operating range of temperatures may be from 800° C. to 1200° C. In some embodiments, such as some instances where a composition is liquid around room temperature, the operating range of temperatures may be from −50° C. to 100° C. In some embodiments, such as some instances where a viscous fluid is being measured during manufacturing, the operating range of temperatures may be from 0° C. to 150° C. In some embodiments, such as in the case of water, the operating range of temperatures may be from 0° C. to 100° C.

In some embodiments, such as for measuring a speed of a vehicle launching into space, the operating range of velocities may be, e.g., up to 11,500 m/s or more. In some embodiments, such as for measuring a speed of a commercial airplane, the operating range of velocities may be, e.g., up to 350 m/s. In some embodiments, such as for measuring a speed of a land or water vehicle, the operating range of velocities may be, e.g., up to 150 m/s. In some embodiments, such as for pumping superheated steam through a pipe, the operating range of velocities may be, e.g., up to 50 m/s. In some embodiments, such as for pumping for pumping various liquids through a pipe (e.g., in a home, at a manufacturing facility, etc.), the operating range of velocities may be, e.g., up to 10 m/s.

In some embodiments, the fluid flowing through the channels is a liquid or semi-solid material. In some embodiments, the liquid or semi-solid is an emulsion, a solution, or a suspension or dispersion. In some embodiments, the fluid flowing through the channels is a colloidal mixture. In some embodiments, the fluid flowing through the channels may be a crème or a gel. In some embodiments, the fluid flowing through the channels may be a final product or an intermediate product. In some cases, the fluid flowing through the channels may be a hair care product (such as a shampoo, conditioner, or styling product), a cosmetic product (such as makeup), a sunscreen product (e.g., containing UV absorbing or reflecting materials), a beverage or food product, or an industrial chemical product (such as raw materials for use in other products or goods).

In some embodiments, the operating range may include measuring the velocity of air at temperatures ranging from −100° C. to +300° C., at velocities up to 300 m/s. In some embodiments, the operating range may include measuring the velocity of water or a solution comprising primarily water at temperatures ranging from −50° C. to 100° C., at velocities up to 50 m/s. In some embodiments, the operating range may include measuring the velocity of a syrup, such as corn syrup and/or a cooking oil such as olive oil, at temperatures from 0° C. to 150° C., at velocities up to 10 m/s.

Figure 6A:
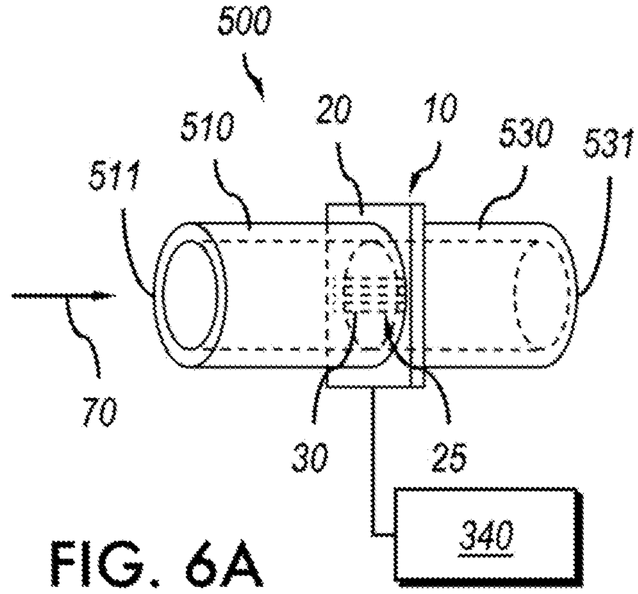
FIGS. 6A-6D are illustrations of a sensor position in combination with pipes, tubes, fluid channels, etc., where either all fluid in the system passes through the opening of the sensor (6A) or only some of the fluid in the system passes through the opening of the sensor (6B, 6C, 6D).
Figure 6B:
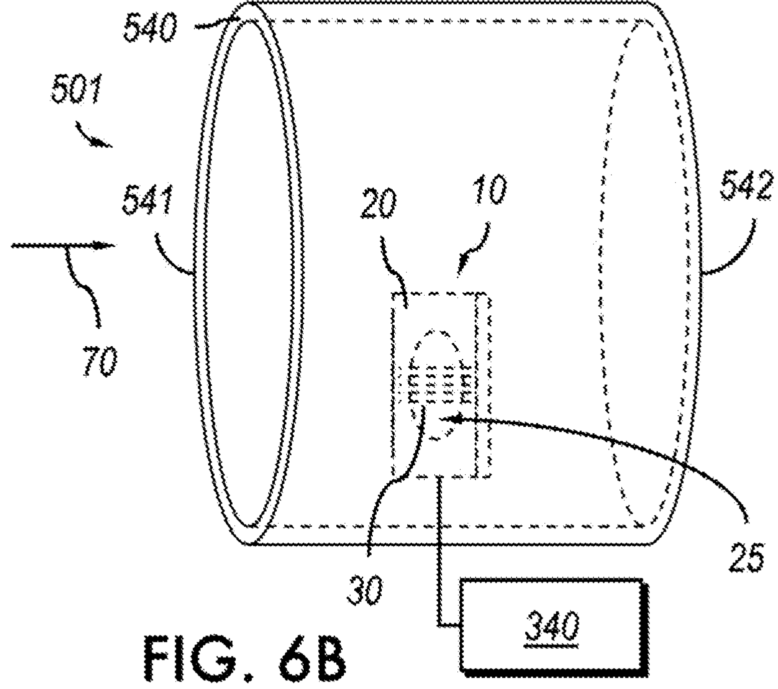

In some embodiments, the velocity sensor may be utilized to determine volumetric flow rates. As seen in FIG. 6A, in some embodiments of a system 500, a first pipe, tube, channel, or other component through which fluid flows 510 is coupled to a velocity sensor 10, which is coupled to a second pipe, tube, channel, or other component through which fluid flows 530. In this kind of system, all fluid flowing (as indicated by the direction of fluid flow 70) through the first pipe, tube, channel, or other component through which fluid flows 510 flows from a first end 510 towards the sensor, then through opening 25 of the velocity sensor, before passing into the second pipe, tube, channel, or other component through which fluid flows 530 and passing through a second end 531 of the second pipe, tube, channel, or other component through which fluid flows. Because all fluid flows through the opening, the volumetric flow rate may be determined by multiplying the velocity measured by the cross-sectional area of the opening 25. In some embodiments, the total amount of fluid that has passed through the sensor's opening within a period of time can be determined based on cross-sectional area and velocity over that period of time, or it can be found through calibration In some embodiments, such as those depicted in FIG. 6B, only a fraction of the total flow in the system is flowing through the opening 25. In FIG. 6B, the system 501 shows a velocity sensor positioned within the volume of space defined by the inner diameter of pipe, tube, or other contained volume through which fluid flows 540. In some embodiments, based on the types of flow in the pipe, etc., volumetric flow rates through the pipe, tube, channel, or other contained volume through which fluid flows 540 can be estimated based on the measured velocity and the ratio of cross-sectional areas. In some embodiments, a ratio of total flow to flow through the opening 25 may be determined (e.g., experimentally or theoretically), and volumetric flow rates and/or total flow may be determined based on the measured velocity through opening 25 and that known ratio.

In some embodiments the flow through the sensor and the remainder of the total flow are separated by a solid material. In some embodiments, the solid material defines two channels.

Figure 6C:
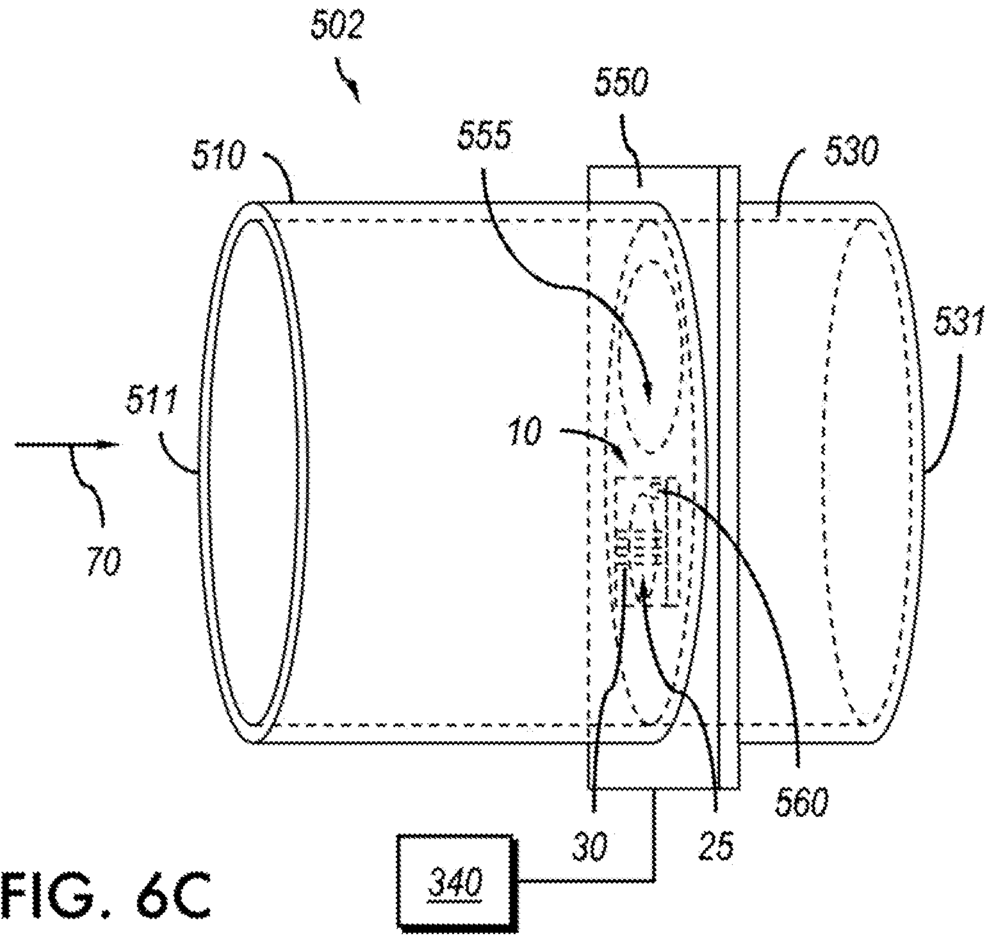

In some embodiments, the solid material may be part of a substrate, such as a velocity sensor substrate or a supporting substrate. In FIG. 6C, the system 502 shows a velocity sensor 10 mounted on a supporting substrate 550, the supporting substrate being positioned at least partially within a volume of space defined by the inner diameter of pipe, tube, channel, or other contained volume. The supporting substrate has two or more holes in it, one of which aligns with the opening in the sensor. Here, first hole 555 is shown, while a second hole through the supporting substrate that coaxially aligned with opening 25 is hidden to keep the figure understandable). In some embodiments, the substrate of the velocity sensor is mounted onto a surface of the supporting substrate. In some embodiments, no supporting substrate is used, and the two or more holes are through the substrate of the velocity sensor (similar to FIG. 6A, but with two holes, one of which has wires extending across it). The flow through the opening 25 in the sensor represents a fraction of the total flow through the system (e.g., entering first end 511 of first pipe, tube, or other contained volume through which fluid flows 510 and exits second end 531 of second pipe, tube, or other contained volume through which fluid flows 530) where the total flow is set by the geometry by the two or more holes. In some embodiments, based on the types of flow in the pipe, etc., volumetric flow rates through the pipe, tube, or other contained volume through which fluid flows 510, 530 can be estimated based on the measured velocity and the ratio of cross-sectional areas. In some embodiments, a ratio of total flow (e.g., through opening 25 and through second hole 560) to flow through the opening 25 may be determined (e.g., experimentally or theoretically), and volumetric flow rates and/or total flow may be determined based on the measured velocity through opening 25 and that known ratio. In some embodiments the substrate may include a Printed Circuit Board (PCB). In some embodiments the substrate may be coated with a parylene. As disclosed herein, in some embodiments, a temperature sensor 560 may be present on the substrate of the velocity sensor and may be operably connected to the measuring circuit. In some embodiments, the temperature sensor 560 may be present on the supporting substrate and may be operably connected to the measuring circuit.

Figure 6D:
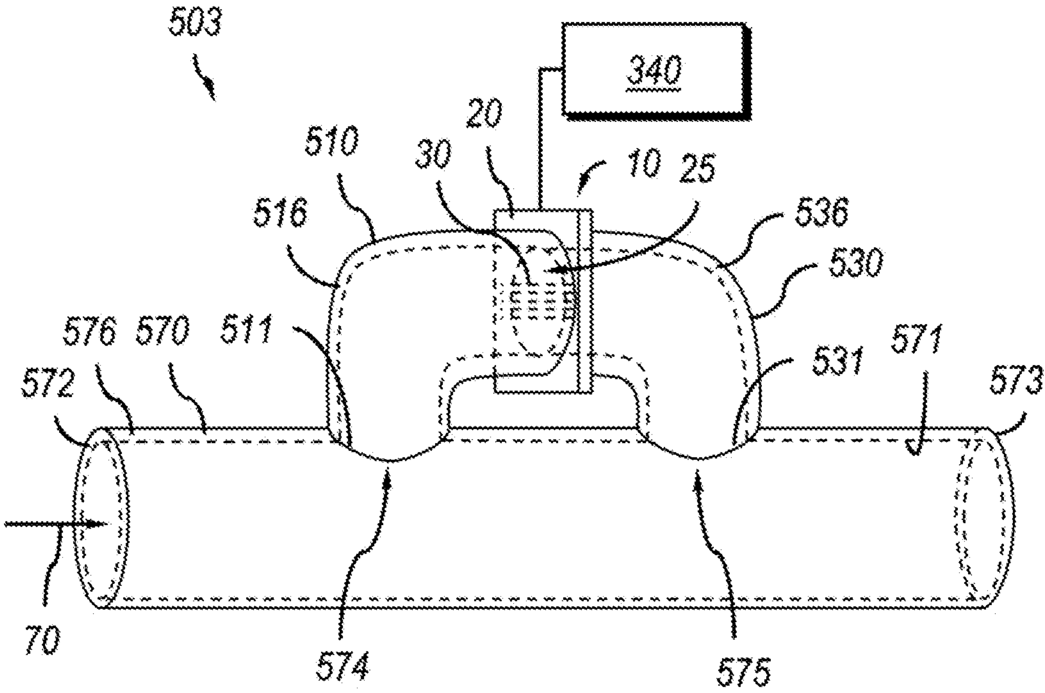

In some embodiments, the solid material may be a sidewall defining various pipes, tubes, channels, or other contained volume. In FIG. 6D, the direction of fluid flow 70 in the system 503 is through a primary fluid pipe, tube, channel, or other component through which fluid flows 570 (also referred to as the primary fluid channel), from an upstream end 572 to a downstream end 573. The system 503 also shows a velocity sensor 10 at least partially within a fluid channel. It should be noted that in some cases, the sensor may be positioned entirely within the fluid channel. In this case, the fluid channel is formed by two pipes, tubes, etc., 510, 530 in a similar fashion to that in FIG. 6A. However, the upstream end 511 of first pipe, etc. 510 is coupled to the primary fluid channel 570. The fluid flowing through the primary fluid channel 570 may enter the first pipe, etc. (ref 510) through a first opening 574 defined through a sidewall 576 of the primary pipe. The fluid flowing through the sensor may then return to the primary fluid channel 570 via the second pipe, etc. 530, which may be coupled to the primary fluid pipe via a second opening 575 defined through the sidewall of the primary pipe downstream from the first opening 574. In some embodiments, based on the types of flow in the pipe, etc., volumetric flow rates through the pipe, tube, or other contained volume through which fluid flows 570 can be estimated based on the measured velocity and the ratio of cross-sectional areas of the first fluid channel (e.g., formed by pipes, etc. 510, 530) and the primary fluid channel 570. In some embodiments, a ratio of total flow (e.g., exiting downstream end 573 of the primary fluid pipe, etc. (ref 570) to flow through the opening 25 may be determined (e.g., experimentally or theoretically), and volumetric flow rates and/or total flow may be determined based on the measured velocity through opening 25 and that known ratio. In some embodiments, the velocity sensor may include a temperature sensor.

In some embodiments the dimension of the conductive wire in the transverse direction 34 is chosen such that the flow behind the wires is non-oscillating, based on, e.g., the expected fluids and velocity ranges to be measured.

In some embodiments, the plurality of conductive wires may be centered within the opening 25, so there may be approximately equal spacing visible through the opening on either side of the plurality of wires. In some embodiments, the distance 39 between one side 26 of the opening 25 and the closest portion 38 of the closest wire to that side may be at least 5 times the distance 35 separating each wire from an adjacent wire. In some embodiments, the distance 39, may be at least 10 times the distance 35. In some embodiments, the distance 39, may be 5-100 times the distance 35. In some embodiments, the distance 39, may be 10-100 times the distance 35.

In some embodiments, length of each wire may be substantially longer than the width. In some embodiments, the length-to-width aspect ratio (e.g., the length 35 to the dimension in the transverse direction 34) of each conductive wire may be at least 5. In some embodiments, the length-to-width ratio may be from 5, 10, 20, 50, 75, or 100 up to 200, 500, 750, or 1000, including all combinations and subranges thereof. In some embodiments, the ratio may be 5-1000. In some embodiments, the ratio may be 5-200. In some preferred embodiments, the length-to-width ratio may be 50-500.

Figure 2A:
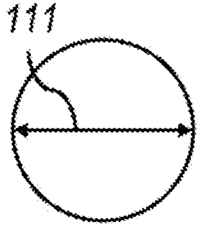
FIGS. 2A-2C are illustrations of cross-sectional views of wires.
Figure 2A:
Figure 2B:
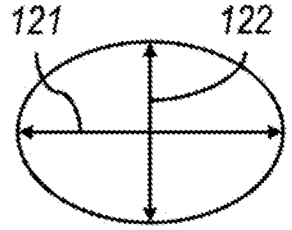
Figure 2C:
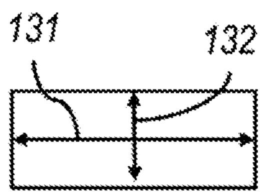

The cross-sectional shape of each wire is not particularly limited. In some embodiments, each wire may, independently, have a round (see FIG. 2A) cross section, an oval (see FIG. 2B) cross section, or a rectangular (see FIG. 2C) cross-section. In some embodiments, it has an irregular cross section. In some embodiments, the round cross-section has a diameter 111. In some embodiments, the oval cross-section may have a major axis 121 in a first direction (e.g., transverse direction, or x-direction in FIG. 1) and a minor axis 122 in a second direction (e.g., in z-direction in FIG. 1). In some embodiments, the rectangular cross-section may have a width 131 and a height 132 (or thickness).

Figure 3A:
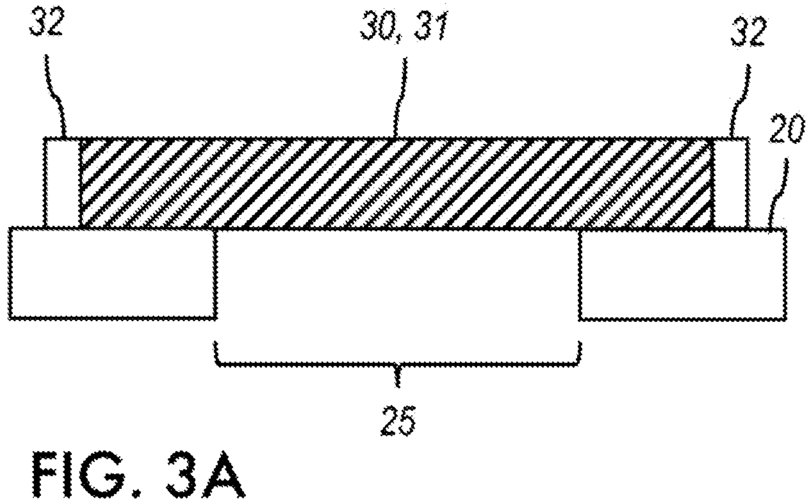
FIGS. 3A-3B are illustrations of cross-sectional views of wires extending across an opening.
Figure 3B:
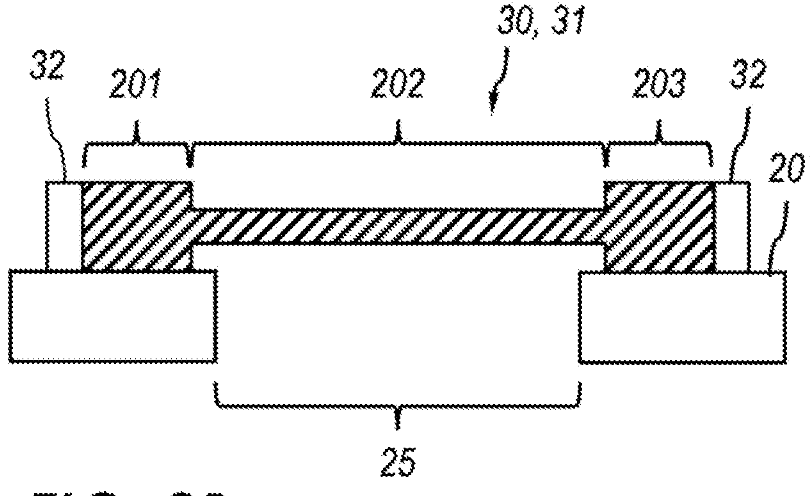

Referring to FIG. 3A, in some embodiments, each wire 30, 31 may, independently, have a substantially constant cross-section from one connector 32 to an opposing connector 32 across the opening 25 in the substrate 20. Referring to FIG. 3B, in some embodiments, each wire 30, 31 may, independently, have a cross-section that has at least one characteristic that varies from one connector 32 to an opposing connector 32 across the opening 25 in the substrate 20. For example, a wire may have a first portion 201 at a first end of wire, on one side of the opening 25 with a first set of characteristics (e.g., a round cross-section with a first diameter), a second portion 202 (e.g., a middle portion) extending across at least some of the opening 25 having a second set of characteristics (e.g., a round cross-section with a second diameter, smaller than the first diameter), and a third portion 203 at a second end of the wire, on the other side of the opening 25, with a third set of characteristics (which may be the same as the first set of characteristics, or may be different). In some embodiments, the second portion 202 extends entirely across the opening 25.

In some embodiments, each wire has the same cross-sectional shape. In some embodiments, at least one wire has a different cross-sectional shape from at least one other wire in the plurality of wires.

In some embodiments, each wire is configured to be free of detectable deflection under expected operating conditions for the sensor. In some embodiments, the electrical effect due to heating is significantly larger than any electrical effect due to deflection under expected operating conditions for the sensor.

In some embodiments, the expected operating conditions may include water (or another liquid) flowing at velocities up to 0.000001 m/s, 0.00001 m/s, 0.0001 m/s, 0.001 m/s, 0.01 m/s, 0.1 m/s, 1 m/s, 5 m/s, 10 m/s, 30 m/s, 50 m/s, 100 m/s, 150 m/s, or 200 m/s. In some embodiments, the expected operating conditions include air (or another gas) flowing at velocities of up to 1 m/s, 5 m/s, 10 m/s, 30 m/s, 50 m/s, 100 m/s, 150 m/s, 200 m/s, 250 m/s, 300 m/s, 350 m/s, 600 m/s, 1,050 m/s (e.g., just over Mach 3), 2,100 m/s (e.g., just over Mach 6), 5,250 m/s (e.g., just over Mach 15), or 10,500 m/s (e.g., just over Mach 30). In some embodiments, the expected operating conditions may include a liquid flowing at a flow rate as low as 10 ul/min, 0.1 ml/min, 1 ml/min, 10 ml/min, 100 ml/min, 1 l/min, 10 l/min, 1 l/s, 10 l/s, or 100 l/s. In some embodiments, the expected velocities may be 10 μl/min-100 l/s. In some embodiments, the expected velocities 10 μl/min-10 l/min. In some embodiments, the expected velocities may be 10 l/min-100 l/s.

In some embodiments, the expected operating conditions may include a fluid temperature of 1.4 K-1300 K. In some embodiments, the expected operating conditions may include a fluid temperature of −273° C.-800° C. In some embodiments, the expected operating conditions may include a fluid temperature of −100° C.-150° C. In some embodiments, the expected operating conditions may include a fluid temperature of −20° C.-50° C. In some embodiments, the expected operating conditions may include a fluid temperature of 0° C.-50° C.

In other embodiments, each conductive wire is configured to have a maximum deflection throughout the predetermined operating range (e.g., under all expected operating conditions as described herein) of less than 0.01% of the length of the wire under expected operating conditions for the sensor. That is, if the wire has a length of 10 mm, the maximum deflection under all expected operating conditions would be 1 μm. In other embodiments, each conductive wire is configured to experience a maximum change of its resistance due to deflection less than 10% of the resistance change due to heating throughout the predetermined operating range (e.g., under all expected operating conditions as described herein).

Each wire may be operably connected to the substrate at both ends 36, 37 (e.g., the portions of the wire that are in positioned above the substrate, as opposed to the portions that are positioned above the opening).

The wires 30, 31 may be connected in series, via a connector 32. The connector may be any appropriate electrical connection between wires. In some embodiments, the connector may be an electrically conductive pattern on the first surface 21. The connector may include through vias and may include an electrically conductive pattern on the second surface 22.

In some embodiments, the connectors may, independently, comprise or consist of a conductive material, such as a metal. In some embodiments, the material of the connector is the same as the material of the wires. In some embodiments, the material of the connector is different from the material of the wires. In some embodiments, portions of the connectors are coated with another material to avoid any solder reaching the wires. In some embodiments, portions of the connectors are coated with a layer of Titanium or Titanium oxide to avoid any solder reaching the wires.

The velocity sensor may also include other components.

Referring to FIG. 1, in some embodiments, the velocity sensor 10 may include one or more additional conductive patterns on the substrate. In some embodiments, the one or more additional conductive patterns may be present on the first surface 21 of the substrate. In some embodiments, the one or more additional conductive patterns may be present on the second surface 22 of the substrate.

In some embodiments, the one or more additional conductive patterns may include one or more contact pads 40, 41 for allowing current to be applied across the wires.

In some embodiments, the velocity sensor may include at least one additional wire 50 that is not connected in series with the plurality of wires 30, 31, where the additional wire(s) 50 have a different sensitivity to temperature as compared to the plurality of wires 30, 31. The additional wire(s) 50 may be electrically coupled to one or more additional contact pads 51, 52.

Figure 4A:
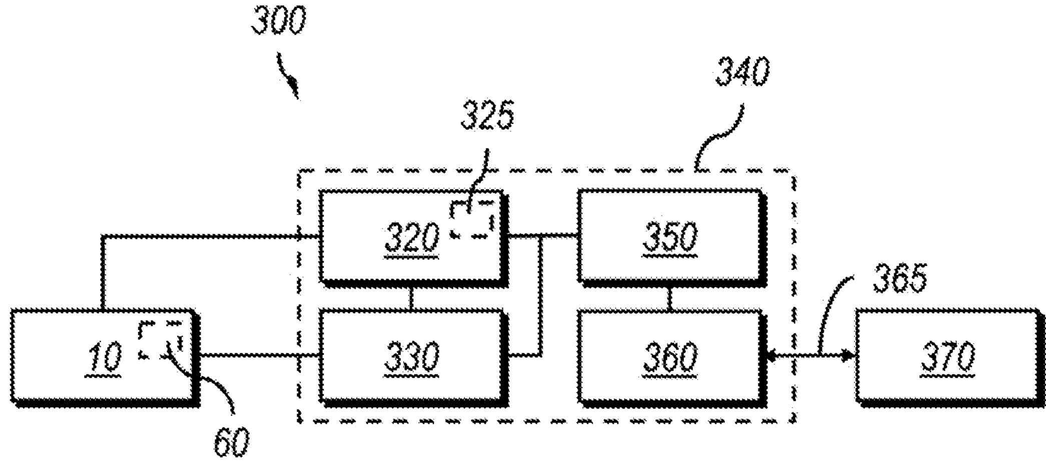
FIGS. 4A-4B are schematics of sensor systems.

Referring to FIG. 4A, an embodiment of a velocity sensor system 300 can be seen. In some embodiments, the velocity sensor system 300 may include an embodiment of a velocity sensor 10 as disclosed herein.

The velocity sensor system 300 may include a measuring circuit 320. The measuring circuit 320 may be configured to measure a voltage and/or a current of the velocity sensor/velocity sensor system. This may include, e.g., a Wheatstone bridge or other circuitry as understood by those of skill in the art. In some embodiments, the measuring circuit 320, is integrated on the same substrate as the sensing wires.

The velocity sensor system 300 may include power circuitry 330. The power circuitry 330 may be configured to ensure each wire operates with overheat ratio α of 1.01-5. In some embodiments, the overheat ratio α is at least 1.01, 1.05, 1.1, 1.2, 1.3, 1.4, or 1.5 up to 2, 3, 4, or 5, including all combinations and subranges thereof. In some embodiments, the power circuitry may be configured such that each wire can be operated at a temperature of 50° C.-500° C. In some embodiments, the power circuitry may be configured such that each wire has a normal operating temperature from 50° C., 60° C., 70° C., 80° C., 90° C., or 100° C., up to 99° C., 100° C., 250° C., 300° C., 350° C., 400° C., 450° C., or 500° C., including all combinations and subranges thereof. In some embodiments, the temperature of the wire is changing with the fluid velocity and is always kept/maintained more than 5° C. warmer than the incoming fluid temperature (e.g., the fluid immediately upstream of the velocity sensor).

In some embodiments, the velocity sensor system 300 may also include a sensor housing 340 that is adapted to protect at least a portion of the measuring circuit 320 and/or the power circuitry 330. In some embodiments, the housing surrounds at least a portion of both the measuring circuit 320 and the power circuitry 330. In some embodiments, the housing surrounds at least a portion of the power circuitry 330, but not the measuring circuit 320.

In some embodiments, the velocity sensor system 300 may include one or more controllers 350.

In some embodiments, the measuring circuit 320 may include a temperature sensor. In some embodiments, the temperature sensor may be added to a measurement circuit board (the measuring circuit 320 on the circuit board). In some embodiments, the velocity sensor may include an additional wire 50 that is configured to function as a temperature sensor. In some embodiments, the velocity sensor may include a temperature sensor 60 on the substrate 20 (see FIG. 1). As shown in FIG. 4A, the system may include multiple temperature sensors. In some embodiments, the velocity sensor system may include a silicon chip as the substrate of the velocity sensor, which contains a temperature sensor 60, and a measuring circuit 320 including a Wheatstone bridge mounted on a printed circuit board, where the printed circuit board also has a separate temperature sensor 325 on it and operably coupled to the system.

As used herein, the term "controller" should not be construed to refer exclusively to hardware capable of executing software, and may implicitly include, without limitation, a microprocessor, digital signal processor (DSP) hardware, application specific integrated circuits (ASIC), and/or field programmable gate array (FPGA). Such controllers may, as appropriate, include, e.g., read only memory (ROM) for storing software, random access memory (RAM), and non-volatile storage. Other hardware, conventional or custom, may also be included. Their function may be carried out through the operation of program logic, through dedicated logic, through the interaction of program control and dedicated logic, or even manually, the technique being selectable by the implementer as more specifically understood from the context.

In some embodiments, the one or more controllers 350 may be operably connected to the measuring circuit 320. In some embodiments, the one or more controllers 350 may be operably connected to the power circuitry 330. In some embodiments, the one or more controllers 350 may be operably connected to both the measuring circuit 320 and power circuitry 330.

In some embodiments, the one or more controllers 350 may be adapted or configured to receive information from the measuring circuit comprising a voltage and/or current. The one or more controllers 350 may be configured to determine a fluid stream velocity based on the received information.

In some embodiments, the one or more controllers 350 is configured to measure the cumulative volume or mass of fluid that has passed through the sensor. In some embodiments, the one or more controllers 350 is configured to measure the cumulative volume or mass of fluid that has passed through the sensor and use that information to control a valve. In some embodiments, the valve is a valve controlling the flow of at least one fluid flowing through the sensor.

In some embodiments, the velocity sensor system 300 may include a wired or wireless transceiver 360. In some embodiments, the wired or wireless transceiver 360 may be configured to communicate 365 information (e.g., to a remote computing node 370, such as a remote server, mobile device, or desktop computer), the information including the voltage of at least one conductive wire, the voltage from a measuring circuit as disclosed herein, the resistance of the wires, and/or a calculated fluid stream velocity.

Figure 4B:
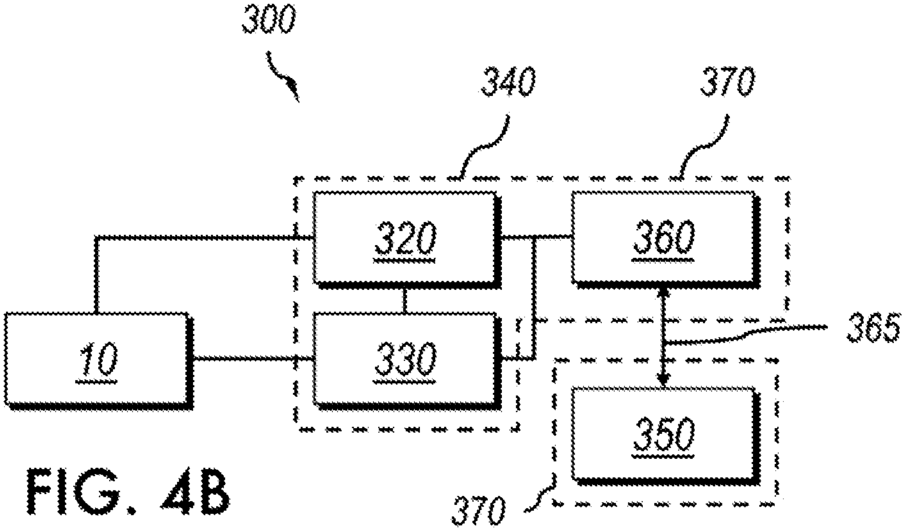

FIG. 4A shows the one or more controllers 350 as being within the sensor housing 340. However, as seen in FIG. 4B, in some embodiments, the housing may surround at least some of the measuring circuit 320, power circuitry 330, and, e.g., any wired or wireless transceiver 360. One or more of the controllers may be remotely located at a remote computing node 370.

Figure 5:
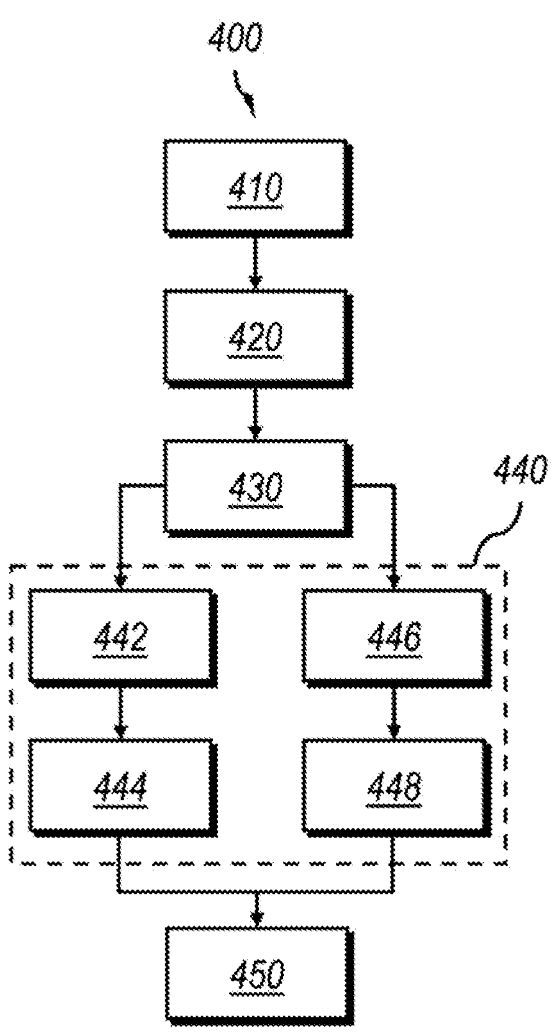
FIG. 5 is a flowchart of a method for measuring velocity.

In some embodiments, a method for determining a velocity of a fluid stream may be provided. Referring to FIG. 5, the method 400 may include providing 410 an embodiment of a velocity sensor as disclosed herein.

The method 400 may include heating 420 each wire of a plurality of wires positioned over an opening through a substrate to a target temperature. In some embodiments, the target temperature may be between 60° C. and 500° C. In some embodiments, the target temperature may be from 50° C., 60° C., 70° C., 80° C., 90° C., or 100° C., up to 250° C., 300° C., 350° C., 400° C., 450° C., or 500° C., including all combinations and subranges thereof. In some embodiments, the exact target temperature is unknown but is always greater than the incoming fluid.

In some embodiments, the temperature of the wire changes with the fluid velocity. In some embodiments, the method includes causing the wire to be heated to a first temperature that is more than 5° C. warmer than the fluid temperature, and then kept or maintained at a second temperature that is more than 5° C. warmer than the fluid temperature. In some embodiments, the first temperature (the starting temperature) and second temperature (the maintained temperature) are substantially the same (e.g., ±1° C.). In some embodiments, the first temperature and second temperature are different.

The method 400 may include passing 430 (or allowing to pass) a fluid through the opening that the wires are positioned across, where the fluid flows around the wires and through the opening. The wires may be positioned substantially orthogonally to the direction of fluid flow.

The method 400 may then include measuring 440 at least one electrical characteristic (e.g., a voltage or a resistance).

In some embodiments, the method may include keeping 442 a substantially constant current (e.g., using a power circuit) across each wire as fluid flows past the wires. The method may include determining 444 (e.g., using a measuring circuit) a change in the resistance of each of the plurality of conductive wires while the fluid is passing through the opening. In some embodiments, this may include measuring the resistance and comparing it to a previously-measured resistance.

In some embodiments, the method may include adjusting 446 a voltage (e.g., using a power circuit) to keep the voltage to the measuring circuit approximately constant. In some embodiments, the method may include adjusting 446 a voltage (e.g., using a power circuit) to keep the resistance across each of the wires substantially constant while fluid flows past the wires. The method may include measuring a voltage 448 (e.g., using a measuring circuit). In some embodiments the voltage 448 is the voltage needed to keep the resistance substantially constant. In some embodiments, the voltage may be an actual voltage. In some embodiments, the voltage may be a change or difference in voltage. In some embodiments, the method may include adjusting 446 a voltage (e.g., using a power circuit) to keep the voltage across the measuring circuit or sensor substantially constant. The method may include utilizing a voltage regulator.

In some embodiments, a voltage regulator is used to supply a constant voltage to the top of a Wheatstone bridge, where the wires of the sensor are one leg of the bridge; by monitoring the voltage difference between the two legs of the bridge (which is a function of the resistance of the sensor) and by knowing what the voltage difference is at zero velocity, one can determine velocity by knowing the voltage difference.

The method may include determining 450 a fluid velocity based on the measured electrical characteristic. In some embodiments, the method may include equating the velocity of the fluid to the result of a function of the measured (e.g., adjusted) voltages. In some embodiments, the method may include equating the velocity of the fluid to the result of a function of the measured resistances. In some embodiments, the method may include equating the velocity of the fluid to the result of a function of the measured resistances and measured temperature.

In some embodiments, the method may include equating the velocity of the fluid to the result of a function of the measured difference in voltage and measured temperature.

In some embodiments, the voltage at no-flow is first registered and subtracted from the voltage used to determine the velocity.

Those skilled in the art will recognize or be able to ascertain using no more than routine experimentation, many equivalents to the specific embodiments of the invention described herein. Such equivalents are intended to be encompassed by the following claims

What is claimed is:

1. A velocity sensor, comprising:

a substrate defining an opening through the substrate from a first surface to a second surface opposite the first surface, the opening configured to allow a fluid to flow through the opening in a direction substantially normal to the first surface or the second surface; and a plurality of substantially parallel conductive wires, connected in series utilizing a plurality of connectors, each of the plurality of substantially parallel conductive wires being positioned across the opening in a direction parallel to the first surface of the substrate, each wire being a metal or metal alloy;

wherein a distance separating each wire of the plurality of substantially parallel conductive wires from an adjacent wire is 0.1-25 times a dimension of the wire in a transverse direction.

2. The velocity sensor according to claim 1, wherein each wire has a dimension in the transverse direction that is less than 50μ/Uρ throughout a predetermined operating range of velocities, where μ is viscosity of a fluid stream the velocity sensor is expected to be utilized within, ρ is density of the fluid stream, and U is velocity of the fluid stream relative to the plurality of substantially parallel conductive wires.

3. The velocity sensor according to claim 1, wherein the distance separating each of the plurality of substantially parallel conductive wires from an adjacent conductive wire is 0.1-5 times the dimension in the transverse direction of the wire.

4. The velocity sensor according to claim 1, wherein the dimension in the transverse direction of each conductive wire is 0.5 μm-40 μm, and the distance separating each of the plurality of substantially parallel conductive wires from an adjacent conductive wire is 2 μm-60 μm.

5. The velocity sensor according to claim 1, wherein the plurality of substantially parallel conductive wires comprises 5-50 wires.

6. The velocity sensor according to claim 1, wherein each of the plurality of substantially parallel conductive wires is configured to have a maximum deflection of less than 0.01% of its length throughout a predetermined operating range of velocities.

7. The velocity sensor according to claim 1, wherein each of the plurality of substantially parallel conductive wires is configured to have a maximum change in its resistance due to deflection less than 10% of a change in its resistance due to heating throughout a predetermined operating range of velocities.

8. The velocity sensor according to claim 1, wherein a length-to-width aspect ratio of each of the plurality of substantially parallel conductive wires is 5-500.

9. The velocity sensor according to claim 1, wherein a length-to-width aspect ratio of each of the plurality of substantially parallel conductive wires is 5-200.

10. The velocity sensor according to claim 1, wherein each of the plurality of substantially parallel conductive wires has a rectangular cross-section.

11. The velocity sensor according to claim 1, wherein each of the plurality of substantially parallel conductive wires is comprised of platinum.

12. The velocity sensor according to claim 1, wherein at least one of the plurality of substantially parallel conductive wires comprises two or more materials.

13. The velocity sensor according to claim 1, further comprising at least one additional wire not connected in series with the plurality of substantially parallel conductive wires, the at least one additional wire having a different sensitivity to temperature from a sensitivity to temperature of each of the plurality of substantially parallel conductive wires.

14. The velocity sensor according to claim 1, wherein at least a portion of one or more connectors of the plurality of connectors are coated with a layer of Titanium or Titanium oxide.

15. The velocity sensor according to claim 1, wherein each of the plurality of substantially parallel conductive wires are coated with a non-conductive material.

16. The velocity sensor according to claim 15, wherein the non-conductive material is a non-conductive polymer.

17. The velocity sensor according to claim 1, wherein the non-conductive polymer is parylene.

18. The velocity sensor according to claim 1, wherein the velocity sensor is configured to be positioned within a fluid channel where fluid flowing through the opening represents a fraction of a total flow of fluid through the fluid channel.

19. The velocity sensor according to claim 1, wherein the velocity sensor is configured to be positioned within a first fluid channel that is connected to a second fluid channel, where fluid flowing through the opening of the velocity sensor represents a fraction of a total flow of fluid exiting the second fluid channel.

20. A velocity sensor system, comprising:

a velocity sensor comprising:

a substrate defining an opening through the substrate from a first surface to a second surface opposite the first surface, the opening configured to allow a fluid to flow through the opening in a direction substantially normal to the first surface or the second surface;

a plurality of substantially parallel conductive wires, connected in series utilizing a plurality of connectors, each of the plurality of substantially parallel conductive wires being positioned across the opening in a direction parallel to the first surface of the substrate, each wire being a metal or metal alloy;

wherein a distance separating each wire of the plurality of substantially parallel conductive wires from an adjacent wire is 0.1-25 times a dimension of the wire in a transverse direction;

a measuring circuit configured to measure at least one of a voltage or a current of the velocity sensor system; and a power circuit configured to ensure each wire operates with an overheat ratio a of between 1.01 and 5.

21. The velocity sensor system according to claim 20, wherein the velocity sensor system is configured such that each of the plurality of substantially parallel conductive wires has a temperature between 50° C. and 500° C.

22. The velocity sensor system according to claim 20, wherein the velocity sensor system is configured such that each of the plurality of substantially parallel conductive wires has a temperature that changes with velocity of the fluid and is configured to be maintained more than 5° C. warmer than a temperature of the fluid.

23. The velocity sensor system according to claim 20, further comprising a sensor housing adapted to protect at least the power circuit.

24. The velocity sensor system according to claim 20, wherein the measuring circuit comprises a Wheatstone bridge.

25. The velocity sensor system according to claim 20, wherein the measuring circuit is integrated on the substrate of the velocity sensor.

26. The velocity sensor system according to claim 20, further comprising a processor configured to receive information from the measuring circuit comprising at least a voltage and determine a fluid stream velocity based on the information.

27. The velocity sensor system according to claim 20, further comprising a processor configured to receive information from the measuring circuit comprising at least a current and determine a fluid stream velocity based on the information.

28. The velocity sensor system according to claim 20, further comprising a wired or wireless transceiver configured to transmit a signal comprising at least a voltage from the measuring circuit.

29. The velocity sensor system according to claim 20, further comprising a wired or wireless transceiver configured to transmit a signal comprising a resistance of the plurality of substantially parallel conductive wires.

30. The velocity sensor system according to claim 20, further comprising a wired or wireless transceiver configured to transmit a signal comprising a calculated fluid stream velocity.

31. The velocity sensor system according to claim 20, further comprising a wired or wireless transceiver configured to transmit a signal comprising at least two of: a voltage from the measuring circuit, a resistance of the plurality of substantially parallel conductive wires, the fluid temperature, and/or a calculated fluid stream velocity.

32. A method for determining velocity of a fluid stream, comprising:

providing a substrate and a plurality of substantially parallel conductive wires, the substrate defining an opening through the substrate from a first surface to a second surface opposite the first surface, the opening configured to allow a fluid to flow through the opening in a direction substantially normal to the first surface or the second surface, the plurality of substantially parallel conductive wires connected in series utilizing a plurality of connectors, each of the plurality of substantially parallel conductive wires being positioned across the opening in a direction parallel to the first surface of the substrate, each wire being a metal or metal alloy;

heating each of the plurality of substantially parallel conductive wires to a temperature more than 5° C. warmer than a temperature of the fluid stream;

allowing a fluid to pass through the opening; and either:

determining a change in a resistance of the plurality of substantially parallel conductive wires while the fluid is passing through the opening and equating the velocity of the fluid to a result of a function of the determined change in resistance; or determining a change in a voltage from the measuring circuit while the fluid is passing through the opening and equating the velocity of the fluid to a result of a function of the determined change in voltage; or adjusting and measuring a voltage to keep a resistance of each of the plurality of substantially parallel conductive wires constant while the fluid is passing through the opening and equating the velocity of the fluid to a result of a function of the measured voltage.

33. The method according to claim 32, wherein each of the plurality of substantially parallel conductive wires has a dimension in a transverse direction that is less than $50\mu/U\rho$ throughout a predetermined operating range, where $\mu$ is viscosity of the fluid stream, $\rho$ is density of the fluid, and U is velocity of the fluid stream relative to the plurality of substantially parallel conductive wires.

* * * * *